United States Patent
Sado

(10) Patent No.: US 8,228,613 B2
(45) Date of Patent: Jul. 24, 2012

(54) WIDE-ANGLE PROJECTION ZOOM LENS AND PROJECTION TYPE DISPLAY APPARATUS

(75) Inventor: Kenzo Sado, Saitama (JP)

(73) Assignee: Fujifilm Corporation, Tokyo (JP)

( * ) Notice: Subject to any disclaimer, the term of this patent is extended or adjusted under 35 U.S.C. 154(b) by 301 days.

(21) Appl. No.: 12/750,021

(22) Filed: Mar. 30, 2010

(65) Prior Publication Data

US 2010/0245786 A1 Sep. 30, 2010

(30) Foreign Application Priority Data

Mar. 31, 2009 (JP) ................ P2009-088032

(51) Int. Cl.
*G02B 15/14* (2006.01)
*G03B 21/14* (2006.01)

(52) U.S. Cl. ..................... 359/683; 353/101

(58) Field of Classification Search ............ 353/101; 359/379, 380, 421, 422, 432, 676, 682, 683, 359/684, 695, 708, 713, 714, 754, 755, 756, 359/761, 762, 763
See application file for complete search history.

(56) References Cited

U.S. PATENT DOCUMENTS

| | | | | |
|---|---|---|---|---|
| 6,008,952 A * | 12/1999 | Yamamoto | | 359/683 |
| 6,636,361 B2 * | 10/2003 | Wada | | 359/680 |
| 6,912,094 B2 * | 6/2005 | Shigematsu et al. | | 359/649 |
| 7,173,776 B2 * | 2/2007 | Tada et al. | | 359/754 |
| 7,751,129 B2 * | 7/2010 | Dodoc et al. | | 359/770 |

FOREIGN PATENT DOCUMENTS

| | | | |
|---|---|---|---|
| JP | 2003-015038 A | 1/2003 |
| JP | 2005-292260 A | 10/2005 |
| JP | 2008-309897 A | 12/2008 |

* cited by examiner

*Primary Examiner* — Georgia Y Epps
*Assistant Examiner* — Renee Naphas
(74) *Attorney, Agent, or Firm* — Birch, Stewart, Kolasch & Birch, LLP

(57) ABSTRACT

A wide-angle projection zoom lens includes, in order from the magnification side: a first group that remains stationary during zooming and has a negative refractive power; second to fourth groups that are movable independently from each other during zooming; a fifth group that remains stationary during zooming and has a positive refractive power. The projection zoom lens is configured to be telecentric on the reduction side. The first group includes five lenses having negative, negative, negative, positive, negative refractive powers. During zooming from the wide-angle end to the telephoto end, the first group and the fifth group remain stationary, and the second to fourth groups are movable in a direction of the optical axis so as to narrow a space between the first group and the second group and widen a space between the fourth group and the fifth group.

14 Claims, 13 Drawing Sheets

FIG. 2
EXAMPLE 1
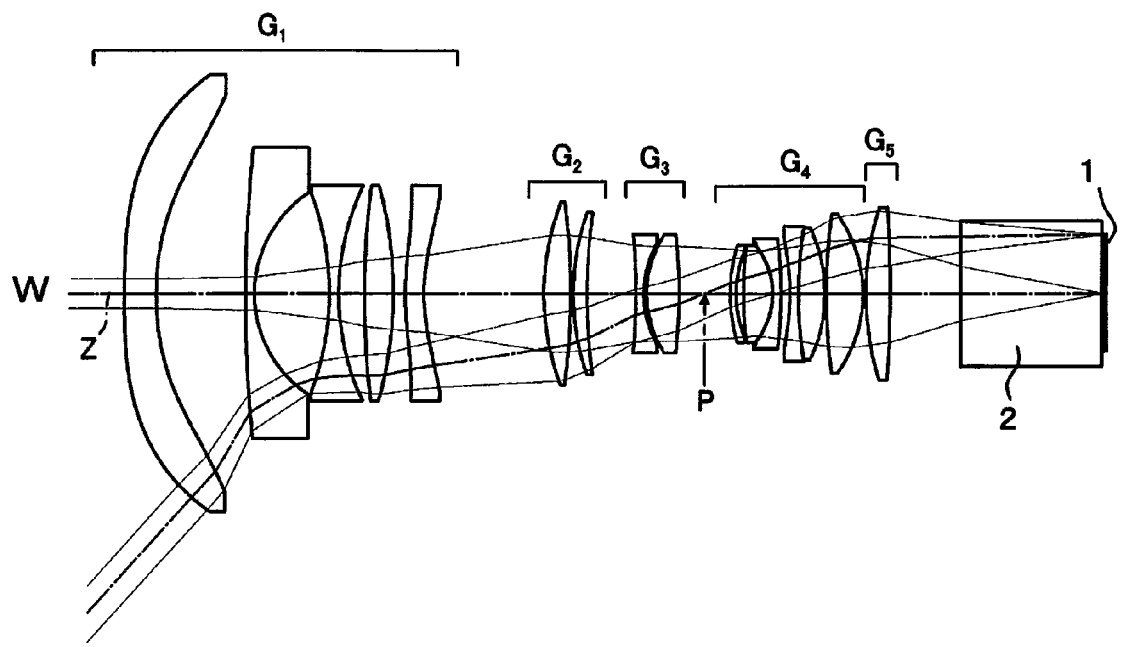
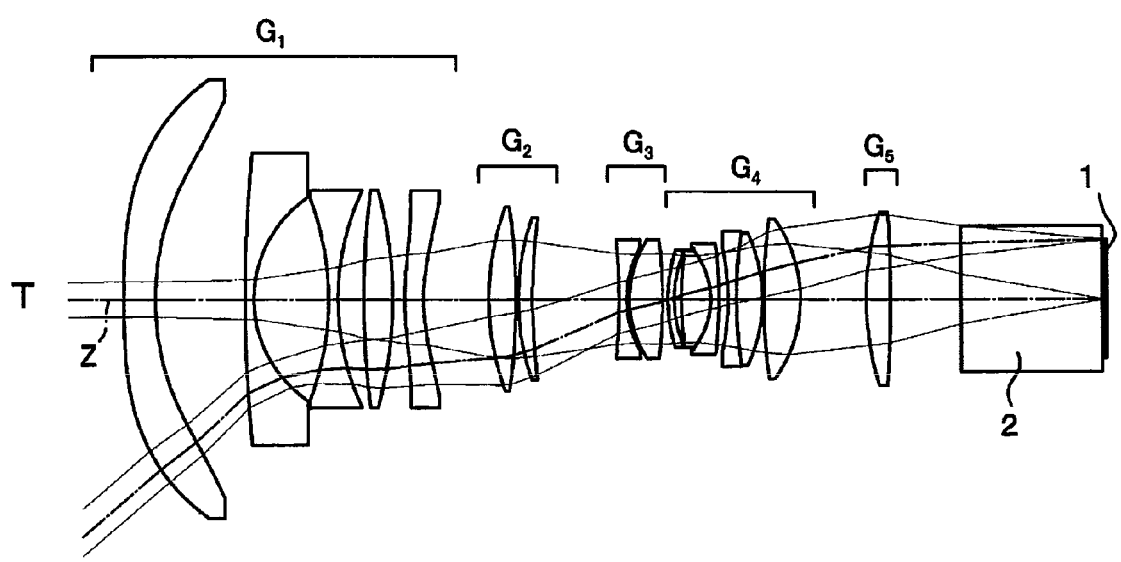

FIG. 4
EXAMPLE 2
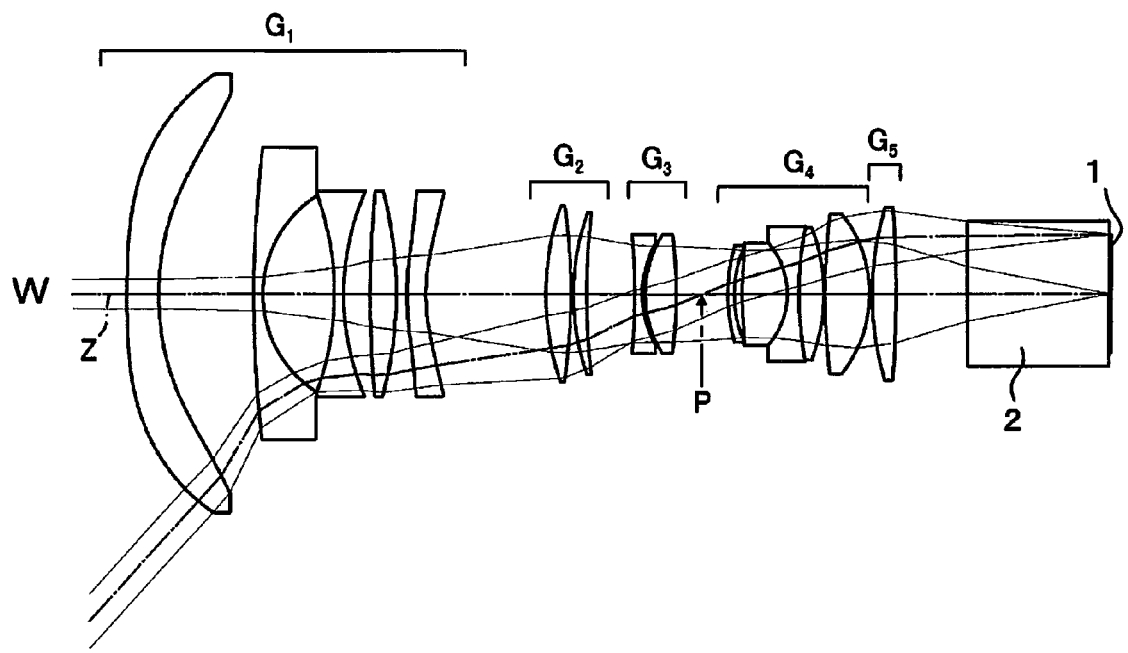
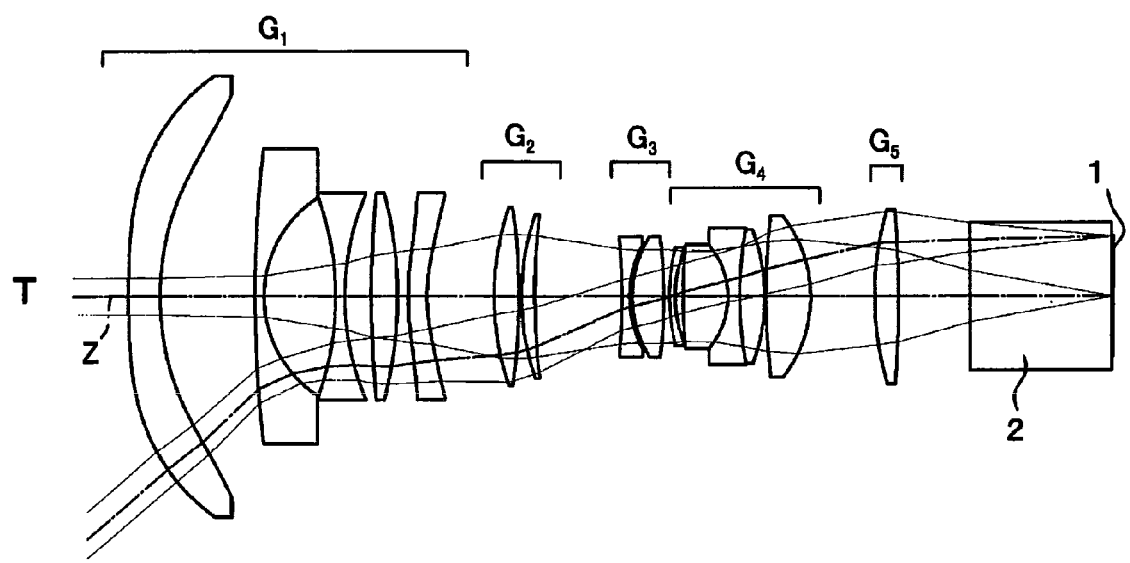

EXAMPLE 4

FIG. 9  EXAMPLE 1

FIG. 10  EXAMPLE 2

FIG. 11  EXAMPLE 3

FIG. 12 EXAMPLE 4

WIDE-ANGLE PROJECTION ZOOM LENS AND PROJECTION TYPE DISPLAY APPARATUS

CROSS-REFERENCE TO RELATED APPLICATIONS

This application is based on and claims priority under 35 USC 119 from Japanese Patent Application No. 2009-088032 filed on Mar. 31, 2009; the entire contents of which are incorporated herein by reference.

BACKGROUND

1. Technical Field

The present invention relates to a zoom lens used as a projection lens for a projector apparatus and the like. In particular, the invention relates to a wide-angle projection zoom lens suitable for projecting an original image, which is formed by a light valve such as a liquid crystal display element or a DMD (digital micro mirror device), onto a screen in an enlarged manner. And, the present invention relates to a projection type display apparatus equipped with the zoom lens.

2. Related Art

Recently, so-called front projection type projector apparatuses for projecting an image onto a screen in front of the apparatus are widely used for school education, corporate job training, presentation, and the like.

In the projection lenses provided in the front projection type projector apparatuses, there is a demand that the lenses have a compact configuration, a wide angle of view, and a zoom function in consideration of adaptability to an installation condition and mobility of the apparatus.

In order to cope with the demand, there are proposed projection zoom lenses disclosed in the following Patent Document 1 (JP-A-2003-015038), Patent Document 2 (JP-A-2005-292260) and Patent Document 3 (JP-A-2008-309897).

In the lenses disclosed in Patent Documents 1 and 2, a half angle of view thereof at the wide-angle end is less than 45 degrees. However, recently, there has been a demand for a wide-angle projection zoom lens having a half angle of view of 45 degrees or more at the wide-angle end while maintaining favorable optical performance.

In fixed-magnification projection lenses provided in rear projection apparatuses, a lens having a half angle of view of 45 degrees or more has been known. However, in the case of a zoom lens, when the half angle of view of 45 degrees or more is intended to be achieved, it is difficult to maintain a favorable optical performance from the wide-angle end to the telephoto end. In particular, it is also difficult to correct satisfactorily on-axis aberrations such as spherical aberration common to angles of view (image heights) and off-axis aberrations such as distortion and image field curvature varied with the angles of view while balancing these aberrations. Further, there is also a problem in that the size of the lens system of the lens group disposed close to the magnification side increases and thus it is difficult to achieve compactness. For this reason, the demanded zoom lens has not been embodied.

On the other hand, the lens disclosed in Patent Document 3 is a projection type zoom lens having a speed of F1.8, a half angle of view ω of 45 degrees or more at the wide-angle end, and a zoom of 1.3 times. However, in such a zoom lens, if a higher speed is intended to be achieved, it becomes extremely difficult to design the optical system thereof. In particular, a projector set is required to secure a relative illumination of around 80%, and there are many cases where only the projection lens is required to secure a relative illumination of 50%. If the ratio of the relative illumination is intended to be increased, as an angle of view thereof becomes wider, it becomes more difficult to improve resolution performance in the periphery thereof. Thus, this causes an increase in costs.

In addition, in order to improve optical performance, for example, two aspheric lenses may be disposed in the lens system. However, unlike a spherical lens, sometimes an aspheric lens may be required to have eccentricity adjusted after assembly thereof since it is difficult to perform centering on each single element of the lens. Hence, there has been a demand for simplification in optical adjustment.

SUMMARY

An illustrative aspect of the invention is to provide a wide-angle projection zoom lens capable of achieving a wide angle of view, maintaining favorable optical performance, achieving compactness, and simplifying eccentricity adjustment for aspheric lenses while improving speed, and to provide a projection type display apparatus equipped with the zoom lens.

According to an aspect of the invention, a wide-angle projection zoom lens, which is telecentric on the reduction side, according to an aspect of the invention includes, in order from a magnification side: a first lens group having a negative refractive power; a second lens group having a positive refractive power; a third lens group having a negative refractive power; a fourth lens group having a positive refractive power; and a fifth lens group having a positive refractive power.

During zooming from the wide-angle end to the telephoto end, the first lens group and the fifth lens group remain stationary, and the second lens group, the third lens group, and the fourth lens group are movable in a direction of an optical axis so as to narrow a space between the first lens group and the second lens group and widen a space between the fourth lens group and the fifth lens group.

The first lens group includes five lenses having negative, negative, negative, positive, negative refractive powers in order from the magnification side, and in the first lens group, the negative lens closest to the magnification side and the negative lens closest to the reduction side are formed as aspheric lenses made of plastic.

Further, it is preferable that the second lens group includes two positive lenses.

Furthermore, it is preferable that the third lens group includes a negative lens and a positive lens in order from the magnification side, a surface of the negative lens on the reduction side is formed as a concave surface, and a surface of the positive lens on the magnification side is formed as a convex surface.

Further, it is preferable that the fourth lens group includes, in order from the magnification side, a negative meniscus lens convex toward the magnification side, a first cemented lens having a cemented surface formed in a shape concave toward the magnification side, a second cemented lens having a cemented surface formed in a shape concave toward the reduction side, and a positive lens.

Furthermore, it is preferable that the fourth lens group includes, in order from the magnification side, a negative meniscus lens convex toward the magnification side, a three-element cemented lens having a first cemented surface formed in a shape concave toward the magnification side and a second cemented surface formed in a shape concave toward the reduction side in order from the magnification side, and a positive lens.

Further, it is preferable that the fifth lens group includes a single positive lens.

According to another aspect of the invention, a projection type display apparatus includes: a light source; a light valve; an illumination optical unit guiding rays originated from the light source into the light valve; and the wide-angle projection zoom lens, which is telecentric on the reduction side, having any one of the above-mentioned configurations. In the apparatus, the rays originated from the light source are optically modulated by the light valve, and are projected onto a screen by the wide-angle projection zoom lens.

Furthermore, the "negative lens" means a lens having a negative refractive power at least in a paraxial region.

Further, the "magnification side" means a projection target side (a screen side). Also, in the case of reduced projection, the screen side is also referred to as the magnification side for convenience of description. On the other hand, the "reduction side" means an original-image display region side (a light valve side). Also, in the case of reduced projection, the light valve side is also referred to as the reduction side for convenience of description.

As described above, in the wide-angle projection zoom lens according to the aspect of the invention, the five lens groups are arranged to have negative, positive, negative, positive, and positive refractive powers in order from the magnification side. During zooming from the wide-angle end to the telephoto end, the first lens group and the fifth lens group remain stationary, and the respective second to fourth lens groups are independently movable in the direction of the optical axis so as to narrow the space between the first lens group and the second lens group and widen the space between the fourth lens group and the fifth lens group.

The first lens group includes five lenses having negative, negative, negative, positive, negative refractive powers in order from the magnification side, and in the first lens group, the negative lens closest to the magnification side and the negative lens closest to the reduction side are formed as aspheric lenses made of plastic.

With such a configuration, it is possible to obtain a projection type display apparatus and a wide-angle projection zoom lens capable of achieving a wide angle of view, maintaining favorable optical performance, and achieving compactness while improving speed.

In particular, in the first lens group, the negative lens closest to the magnification side is formed as an aspheric lens. Thus, it is possible to make a ray, which exits at a large angle of view, out of all the rays pass the position farthest from the optical axis in the lens system. Hence, this configuration is remarkably effective in correcting distortion and image field curvature.

Further, as described above, in the aspects of the invention, the negative lens closest to the reduction side in the first lens group is formed as an aspheric lens. Instead of this, for example, in the fourth lens group or the fifth lens group, an aspheric lens may be disposed. In this case, it is also possible to exhibit the effect on the optical performance. However, since it is difficult to apply the centering, which can be performed by the spherical lens itself, to the aspheric lens, adjusting eccentricity thereof separately is required. Accordingly, as described in the aspect of the invention, by providing the reduction side aspheric surface so as to be closest to the reduction side in the first lens group, it is possible to adjust the eccentricities of the two aspheric lenses only within the first lens group which remains stationary during zooming, and it is also possible to simplify further an operation for the adjustment of the eccentricities.

BRIEF DESCRIPTION OF THE DRAWINGS

FIG. 2 is a configuration diagram illustrating arrangement of lens groups in the wide-angle end (W) and the telephoto end (T) of the wide-angle projection zoom lens according to Example 1.

FIG. 4 is a configuration diagram illustrating arrangement of lens groups in the wide-angle end (W) and the telephoto end (T) of the wide-angle projection zoom lens according to Example 2.

DETAILED DESCRIPTION

Figure 1:
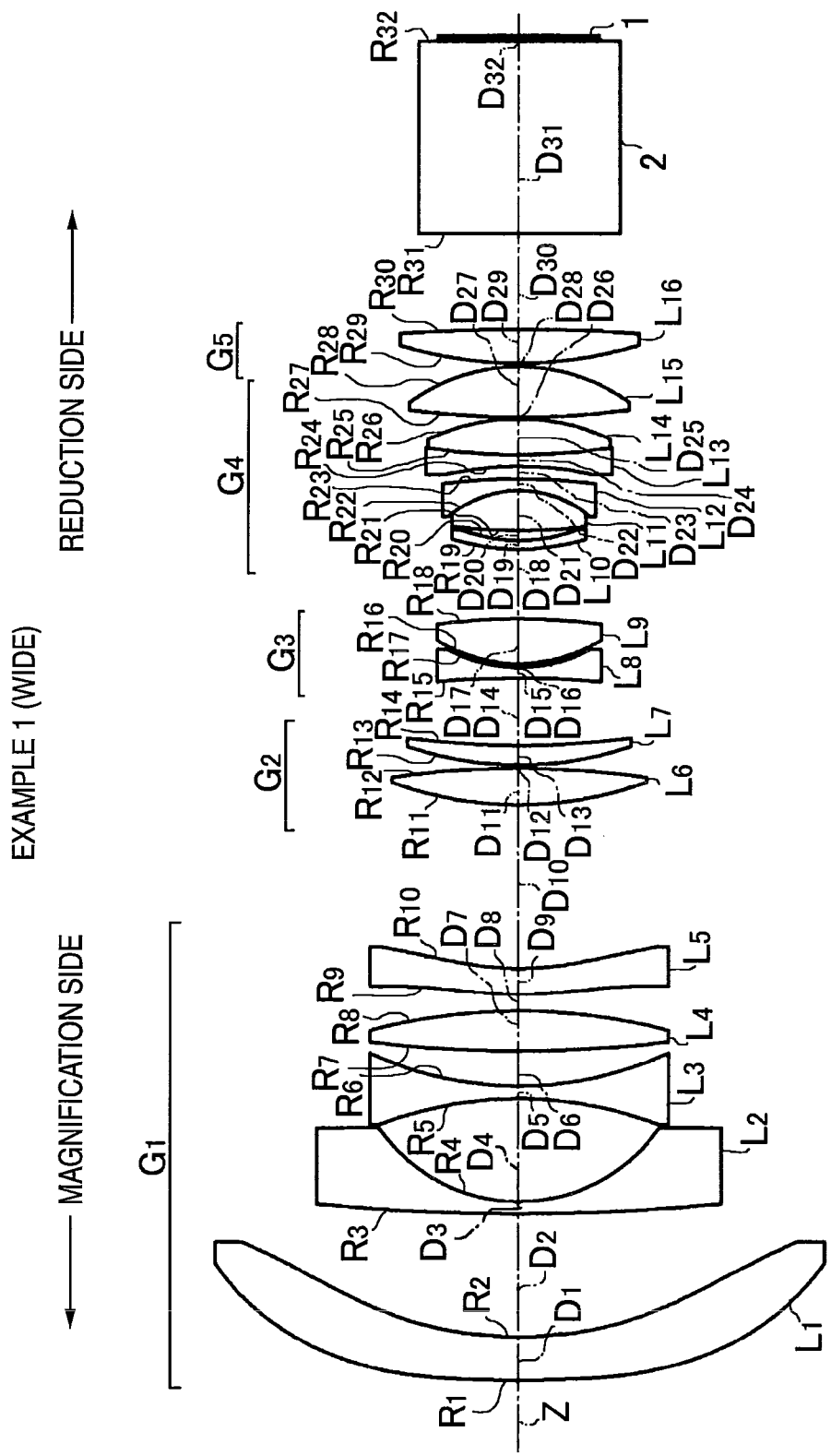
FIG. 1 is a detailed configuration diagram illustrating a wide-angle projection zoom lens (the wide-angle end) according to Example 1.

Hereinafter, the exemplary embodiments of the invention will be described with reference to the accompanying drawings. FIG. 1 shows a wide-angle projection zoom lens according to an embodiment of the invention, and is a lens configuration diagram of Example 1 to be described later. The lens is described below as a representative embodiment. Furthermore, in the drawing, the reference sign Z represents the optical axis.

The wide-angle projection zoom lens according to the embodiment includes, in order from the magnification side (the screen side): a first lens group $G_1$ that remains stationary during zooming, has a negative refractive power, and is used for focusing; second to fourth lens groups $G_2$ to $G_4$ (the second lens group G2 having a positive refractive power, the third lens group $G_3$ having a negative refractive power, and the fourth lens group $G_4$ having a positive refractive power) as three movable zoom lens groups that are movable independently from each other during zooming; a fifth lens group $G_5$ that remains stationary during zooming, has a positive refractive power, and is used to fix a position of a pupil (to prevent the position of the exit pupil in the whole system from changing during zooming). The projection zoom lens is configured to be telecentric (or substantially telecentric) on the reduction side.

In the wide-angle projection zoom lens according to the embodiment, during zooming from the wide-angle end to the telephoto end, the first lens group $G_1$ and the fifth lens group $G_5$ remain stationary, and the second lens group $G_2$, the third lens group $G_3$, and the fourth lens group $G_4$ are movable in a direction of the optical axis Z so as to narrow a space between the first lens group $G_1$ and the second lens group $G_2$ and widen a space between the fourth lens group $G_4$ and the fifth lens group $G_5$.

Furthermore, in the wide-angle projection lens according to the embodiment shown in FIG. 1, rays emitted from the right side of the drawing and containing image information displayed on an image display surface 1 of a light valve are incident on the wide-angle projection lens through a glass block 2, and are projected in an enlarged manner on a screen on the left side of the drawing. In FIG. 1, only one image display surface 1 is illustrated for convenience of description, but in some projection type display apparatuses, there are arranged three light valves for three primary color rays into which rays emitted from a light source are separated by using a color separation optical system, thereby enabling full-color-image display (refer to FIG. 13). By arranging a color synthesizing means such as a cross dichroic prism (which may be a glass block as described in some examples) on the glass block 2, it is possible to synthesize the three primary color rays.

The first lens group $G_1$ includes, in order from the magnification side (the screen), five lenses (first lens $L_1$ to fifth lens $L_5$) having negative, negative, negative, positive, negative refractive powers, and is configured to adjust a focal length by moving all the lenses in the direction of the optical axis Z or by moving (floating) the fourth lens $L_4$ and the fifth lens $L_5$ so as to change the space therebetween. Furthermore, in the first lens group $G_1$, the first negative lens (the first lens $L_1$), which is the negative lens closest to the magnification side, and the fifth negative lens (the fifth lens $L_5$), which is the negative lens closest to the reduction side, are formed as aspheric lenses made of plastic.

As described above, since the first lens group $G_1$ is configured to include, in order from the magnification side, five lenses (the first lens $L_1$ to fifth lens $L_5$) having negative, negative, negative, positive, negative refractive powers, it is possible to suppress an increase in diameter of the first lens group $G_1$ and achieve compactness as a whole while increasing an angle of view at the wide-angle end.

Further, in the first lens group $G_1$ used for focusing, the first negative lens (the first lens $L_1$) and the fifth negative lens (the fifth lens $L_5$) in order from the most magnification side are formed as aspheric lenses. Thereby, in the first lens group $G_1$ in which the angle of view and the optical path are significantly changed by zooming, the three lenses (the second lens $L_2$, third lens $L_3$ and the fourth lens $L_4$) are inserted, and thereby an aspheric surface is disposed to separate the lens group into the front and the rear. As a result, it is possible to correct aberrations satisfactorily from the wide-angle end to the telephoto end.

The aspheric surface of the first lens $L_1$ is suitable for correcting aberrations according to the angles of view so as to cope with off-axis aberrations such as distortion and image field curvature. The aspheric surface of the fifth lens $L_5$ is suitable for correcting aberrations common to angles of view so as to cope with the on-axis aberrations such as spherical aberration. The reason is that, since the first lens group $G_1$ is configured to mainly include the negative lenses as described above, the diameter of rays, which are propagated toward respective image points, can be decreased in the first lens $L_1$ and can be increased in the fifth lens $L_5$ mostly on the telephoto side.

Further, since the fifth lens $L_5$ of the first lens group $G_1$ is formed as a reduction-side aspheric lens, it is possible to adjust the eccentricities of the two aspheric lenses only within the first lens group $G_1$ which remains stationary, and it is also possible to simplify further an operation for the adjustment of the eccentricities.

Further, since the second lens group $G_2$ is configured to include two positive lenses, it is possible to secure speed efficiently and reduce various aberrations while employing a small number of lenses.

Further, the third lens group $G_3$ includes, in order from the magnification side, a negative lens and a positive lens. In addition, the reduction side surface of the negative lens is formed as a concave surface, and the magnification side surface of the positive lens is formed as a convex surface. With such a configuration, similarly to the above, it is possible to secure speed efficiently and reduce various aberrations while employing a small number of lenses.

Further, the fourth lens group $G_4$ includes, in order from the magnification side, a negative meniscus lens convex toward the magnification side, a first cemented lens having a cemented surface formed in a shape concave toward the magnification side, a second cemented lens having a cemented surface formed in a shape concave toward the reduction side, and a positive lens. Alternatively, the fourth lens group $G_4$ includes, in order from the magnification side, a negative meniscus lens convex toward the magnification side, a three-element cemented lens having a first cemented surface formed in a shape concave toward the magnification side and a second cemented surface formed in a shape concave toward the reduction side in order from the magnification side, and a positive lens. With such a configuration, it is possible to correct various aberrations, in particular, chromatic aberration. Furthermore, by employing the three-element cemented lens, it is possible to improve the effect of the chromatic aberration correction. On the other hand, by employing two two-element cemented lenses as compared with the case of using the three-element cemented lens, it is possible to reduce further the adverse effect caused by heat expansion.

Further, it is preferable that the fourth lens group $G_4$ include two cemented surfaces arranged therein. However, there is a concern that a trouble (such as detachment of an adhesive) may be caused in the cemented portions by the effect of heat when the position, at which the diameter of the rays is narrowed down, approaches the vicinities of the cemented surfaces. In the embodiment, for example, in all the examples as shown in FIGS. 2, 4, 6, and 8, the position P, at which the principal rays intersect with each other, is located on the magnification side from the fourth lens group $G_4$. Therefore, the configuration is made so as to be able to prevent the problem being caused in the cemented portions as described above.

Further, since the fifth lens group $G_5$ includes a single positive lens, it is possible to simplify the configuration, and thus this is preferable.

Furthermore, in the operation of adjusting a focal length of the first lens group $G_1$, by moving (floating) the fourth lens $L_4$ and the fifth lens $L_5$ so as to change the space between the two lenses as described above, it is possible to reduce the weight of the movable lenses, and thus this is preferable.

Figure 13:
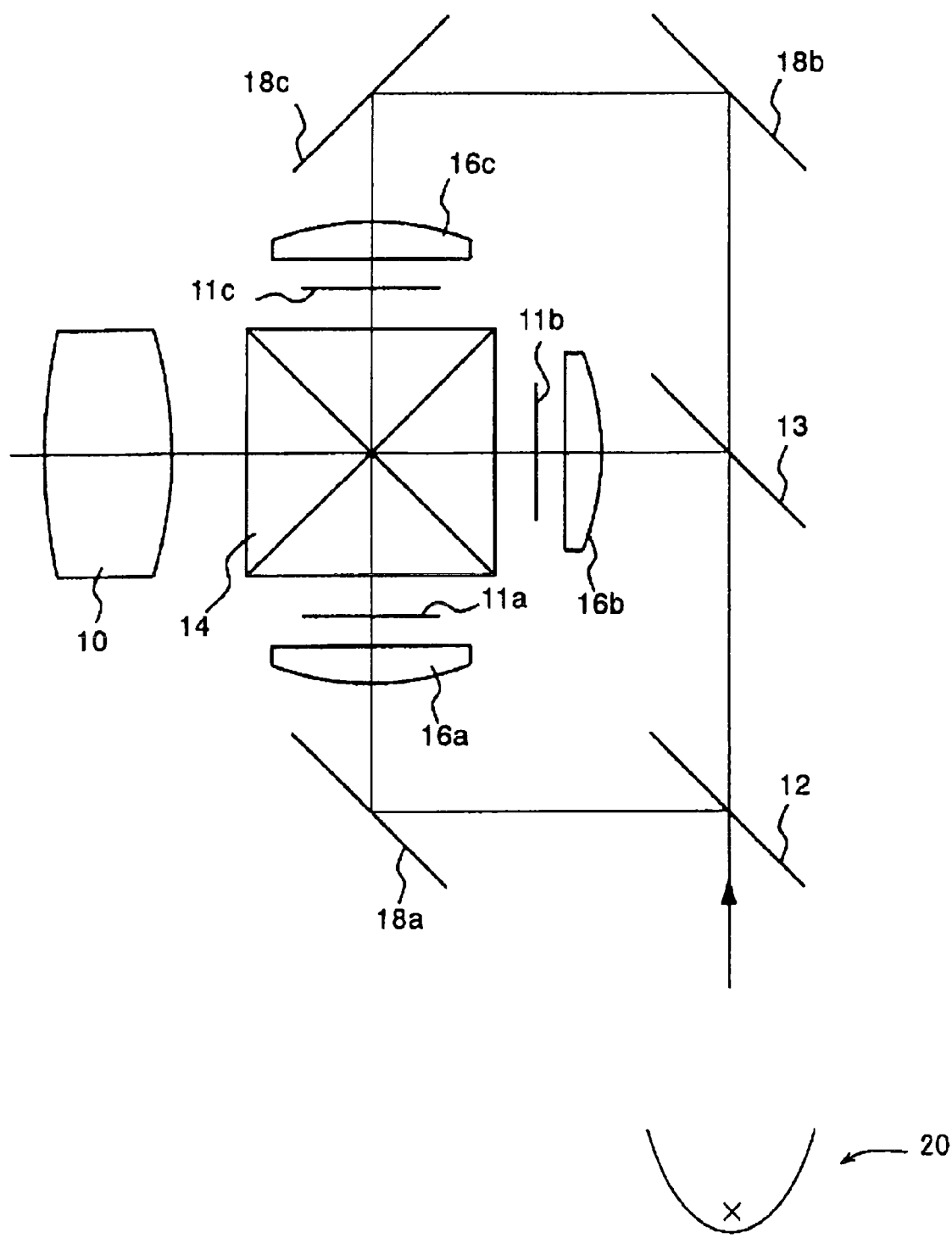
FIG. 13 is a schematic configuration diagram illustrating a projection type display apparatus according to an embodiment.

Next, an example of the projection type display apparatus equipped with the above-mentioned projection type zoom lens is described with reference to FIG. 13. The projection type display apparatus shown in FIG. 13 has transmissive liquid crystal valves 11a to 11c as light valves. In the apparatus, the wide-angle projection zoom lens according the above-mentioned embodiment is used as a wide-angle projection zoom lens 10. Further, although not shown, between the light source 20 and the dichroic mirror 12, white rays, which are originated from a light source 20, are incident through an illumination optical section on the transmissive liquid crystal valves 11a to 11c, which correspond to three color rays (G light, B light, and R light) respectively, and are optically modulated, and then colors of the rays are synthesized by a dichroic prism 14, thereby projecting the rays on a screen, which is not shown, through the projection type zoom lens 10. The apparatus includes dichroic mirrors 12 and 13 for color separation, the cross dichroic prism 14 for color synthesis, condenser lenses 16a to 16c, and total reflection mirrors 18a to 18c. Since the projection type display apparatus according to the embodiment employs the wide-angle projection zoom lens according to the embodiment, it is possible to achieve a speed of F1.70 at the wide-angle end, increase the half angle of view ω up to 45 degrees or more at the wide-angle end, and decrease the size of the apparatus while providing a zoom function. As a result, it is possible to improve convenience and mobility of the apparatus remarkably.

Furthermore, the wide-angle projection zoom lens according to the embodiment of the invention is not limited to be used as a wide-angle projection zoom lens of a projection type display apparatus using a liquid crystal display panel. However, the projection zoom lens may be used as a wide-angle projection zoom lens of an apparatus using another optical modulation means such as a DMD.

Hereinafter, specific examples of the wide-angle projection zoom lens according to the embodiment of the invention will be described. In FIGS. 3 to 8 showing the configurations of Examples 2 to 4, the members having the same effect as Example 1 will be referenced by the same reference numerals and signs used in FIGS. 1 and 2.

Example 1

FIGS. 1 and 2 (FIG. 1 is a diagram illustrating a lens system configuration at the wide-angle end, FIG. 2 is a diagram illustrating arrangement of the respective lens groups at the wide-angle end (W) and the telephoto end (T)) show the following configuration. The wide-angle projection zoom lens according to Example 1 includes, in order from the magnification side: a first lens group $G_1$ that remains stationary during zooming, has a negative refractive power, and is used for focusing; a second lens group $G_2$ that is movable during zooming and has a positive refractive power; a third lens group $G_3$ that is movable during zooming and has a negative refractive power; a fourth lens group $G_4$ that is movable during zooming and has a positive refractive power; a fifth lens group $G_5$ that remains stationary during zooming, has a positive refractive power, and is used to fix a position of a pupil. The projection zoom lens is configured to be telecentric on the reduction side. Further, an image display surface 1 of the light valve and a glass block 2 are arranged on the reduction side of the fifth lens group $G_5$ in this order from the reduction side. Furthermore, the three movable zoom lens groups $G_2$ to $G_4$ are configured to be moved independently from each other during zooming.

Further, during zooming from the wide-angle end to the telephoto end, the first lens group $G_1$ and the fifth lens group $G_5$ remain stationary, and the second lens group $G_2$, the third lens group $G_3$, and the fourth lens group $G_4$ are independently movable in a direction of the optical axis Z so as to narrow a space between the first lens group $G_1$ and the second lens group $G_2$ and widen a space between the fourth lens group $G_4$ and the fifth lens group $G_5$.

As described above, the first lens group $G_1$ includes five lenses (first lens $L_1$ to fifth lens $L_5$) successively arranged to have negative, negative, negative, positive, negative refractive powers in order from the most magnification side. The first lens $L_1$ is formed as a plastic lens, of which both surfaces are aspheric, having a negative refractive power in the paraxial region, and the second lens $L_2$ is formed as a negative meniscus lens concave toward the reduction side, and the third lens $L_3$ is formed as a biconcave lens. Further, the fourth lens $L_4$ is formed as a biconvex lens, and the fifth lens $L_5$ is formed as a plastic lens, of which both surfaces are aspheric, having a small negative refractive power in the paraxial region.

Further, the second lens group $G_2$ includes a sixth lens $L_6$ formed as a biconvex lens and a seventh lens $L_7$ formed as a positive meniscus lens convex toward the magnification side.

Furthermore, the third lens group $G_3$ includes an eighth lens $L_8$ formed as a biconcave lens and a ninth lens $L_9$ formed as a biconvex lens.

Further, the fourth lens group $G_4$ includes a tenth lens $L_{10}$ formed as a negative meniscus lens convex toward the magnification side, an eleventh lens $L_{11}$ formed as a biconvex lens, a twelfth lens $L_{12}$ formed as a negative meniscus lens convex toward the reduction side, a thirteenth lens $L_{13}$ formed as a biconcave lens, a fourteenth lens $L_{14}$ formed as a biconvex lens, and a fifteenth lens $L_{15}$ formed as a biconvex lens. Furthermore, the eleventh lens $L_{11}$ and the twelfth lens $L_{12}$ (cemented surface is formed in a shape concave toward the magnification side) are cemented to each other. In addition, the thirteenth lens $L_{13}$ and the fourteenth lens $L_{14}$ (cemented surface is formed in a shape concave toward the reduction side) are cemented to each other.

Further, the fifth lens group $G_5$ for fixing the pupil position includes only a sixteenth lens $L_{16}$ formed as a biconvex lens.

Shapes of the aspheric surfaces in the first lens $L_1$ and the fifth lens $L_5$ are defined by the following aspheric expression. In these first lens $L_1$ and fifth lens $L_5$, it is possible to obtain an aberration correction effect even when any one surface of the lens is formed as an aspheric surface. However, it is more preferable that both surfaces of the lens be formed as aspheric surfaces.

$$Z = \frac{Y^2/R}{1+\sqrt{1-K \times Y^2/R^2}} + \sum_{i=2}^{6} A_{2i} Y^{2i} \quad \text{[Numerical Expression 1]}$$

where

Z is a length of a perpendicular from a point on an aspheric surface, which is apart from the optic axis at a distance Y, to a tangential plane (a plane perpendicular to the optic axis) of the top of the aspheric surface, Y is a distance from the optic axis, R is a radius of curvature of an aspheric surface near the optic axis, K is an eccentricity, and $A_{2i}$ is an aspheric surface coefficient (i=2 to 6).

The upper part of Table 1 shows radius of curvatures R (mm) of the lens surfaces of the projection lens system according to Example 1, center thicknesses of the lenses and air spaces between the lenses D (mm) (hereinafter, those are referred to as "on-axis surface spacings"), refractive indices $N_d$ of the lenses at the d-line, and Abbe numbers $v_d$ of the lenses at the d-line. Furthermore, in Table 1 and the following tables, each numeral of the surface numbers represents the order from the magnification side, and each surface having the reference sign * attached to the right side of each surface number is an aspheric surface. In Example 1 and the following Example 2, the radius of curvatures R of the aspheric surfaces of those are represented as values of the radius of curvatures on the optical axis Z in the respective tables. However, in the corresponding lens configuration diagrams, some of the extracted lines may not be extracted from the intersection between the lens surfaces and the optical axis Z for convenience of description.

Further, as described above, in the wide-angle projection zoom lens according to Example 1, the movable zoom lens groups $G_2$ to $G_4$ are configured to be moved independently from each other in the direction of the optical axis Z during zooming. The lower part of Table 1 shows values of the variable spaces ($D_{10}$, $D_{14}$, $D_{18}$, and $D_{28}$) at the wide-angle end (WIDE) and telephoto end (TELE) and the medium position (MEDIUM) therebetween.

Further, Table 2 shows values of the respective constants K, $A_4$, $A_6$, $A_8$, $A_{10}$, and $A_{12}$ corresponding to the respective aspheric surfaces.

TABLE 1

FOCAL LENGTH: 9.77-12.69, ANGLE OF VIEW: 96.7 DEGREES, SPEED: F1.70-1.88

| Surface Number | R | D | Effective Diameter | $N_d$ | $v_d$ |
|---|---|---|---|---|---|
| 1* | 249.4857 | 5.800 | 80.73 | 1.49100 | 57.6 |
| 2* | 54.3104 | 16.311 | 73.36 | | |
| 3 | 272.8409 | 1.640 | 51.80 | 1.79952 | 42.2 |
| 4 | 22.7995 | 13.698 | 37.68 | | |
| 5 | −52.6320 | 1.670 | 37.54 | 1.48749 | 70.2 |
| 6 | 47.3655 | 4.683 | 36.95 | | |
| 7 | 163.6437 | 5.305 | 37.61 | 1.83400 | 37.2 |
| 8 | −78.1391 | 2.233 | 37.75 | | |
| 9* | 56.0901 | 3.400 | 35.95 | 1.49100 | 57.6 |
| 10* | 35.0287 | **(Variable 1) | 34.95 | | |
| 11 | 49.1828 | 4.921 | 32.66 | 1.71472 | 52.6 |
| 12 | −124.4484 | 0.419 | 32.28 | | |
| 13 | 46.3317 | 2.599 | 29.06 | 1.74407 | 27.8 |
| 14 | 111.3993 | **(Variable 2) | 28.41 | | |
| 15 | −127.5123 | 1.400 | 20.71 | 1.71334 | 53.9 |
| 16 | 20.0425 | 0.500 | 18.83 | | |
| 17 | 20.4155 | 6.103 | 18.85 | 1.48730 | 70.5 |
| 18 | −85.8969 | **(Variable 3) | 18.00 | | |
| 19 | 31.1272 | 1.140 | 16.71 | 1.80518 | 25.4 |
| 20 | 21.9262 | 1.322 | 16.33 | | |
| 21 | 74.8072 | 5.377 | 16.38 | 1.48749 | 70.2 |
| 22 | −14.6213 | 1.540 | 17.02 | 1.83400 | 37.2 |
| 23 | −76.5371 | 1.638 | 19.03 | | |
| 24 | −46.6118 | 1.540 | 19.98 | 1.83400 | 37.2 |
| 25 | 81.6510 | 4.856 | 22.40 | 1.49700 | 81.6 |
| 26 | −28.7184 | 0.200 | 23.88 | | |
| 27 | 115.3236 | 6.695 | 27.67 | 1.49700 | 81.6 |
| 28 | −25.5457 | **(Variable 4) | 28.51 | | |
| 29 | 54.8801 | 4.444 | 31.41 | 1.80498 | 45.6 |
| 30 | −251.7329 | 12.740 | 31.13 | | |
| 31 | ∞ | 25.500 | 27.11 | 1.51633 | 64.1 |
| 32 | ∞ | 0.200 | 22.06 | | |

| | $D_{10}$ (Variable 1) | $D_{14}$ (Variable 2) | $D_{18}$ (Variable 3) | $D_{28}$ (Variable 4) |
|---|---|---|---|---|
| WIDE | 21.875 | 8.987 | 9.326 | 0.500 |
| MEDIUM | 16.217 | 12.105 | 5.917 | 6.452 |
| TELE | 11.824 | 15.909 | 1.000 | 11.960 |

*Aspheric Surface
**Variable Space

TABLE 2

*Aspheric Coefficient

| Surface Number | K | $A_4$ | $A_6$ |
|---|---|---|---|
| 1st Surface | 1.000000 | 7.7658398E−06 | −5.3631839E−09 |
| 2nd Surface | 1.000000 | 3.9805157E−06 | −3.6043609E−09 |

TABLE 2-continued

*Aspheric Coefficient

| | | | |
|---|---|---|---|
| 9th Surface | 1.000000 | −2.5760940E−05 | 3.2744074E−08 |
| 10th Surface | 1.000000 | −2.8407899E−05 | 3.1951856E−08 |

| Surface Number | $A_8$ | $A_{10}$ | $A_{12}$ |
|---|---|---|---|
| 1st Surface | 3.4952277E−12 | −1.2921198E−15 | 2.5463431E−19 |
| 2nd Surface | −2.3889191E−12 | 2.6035371E−15 | −6.4328160E−19 |
| 9th Surface | −3.5095364E−11 | 3.9581937E−14 | −1.9128572E−17 |
| 10th Surface | −1.8871314E−11 | −2.7396853E−14 | 6.4028294E−17 |

Example 2

Figure 3:
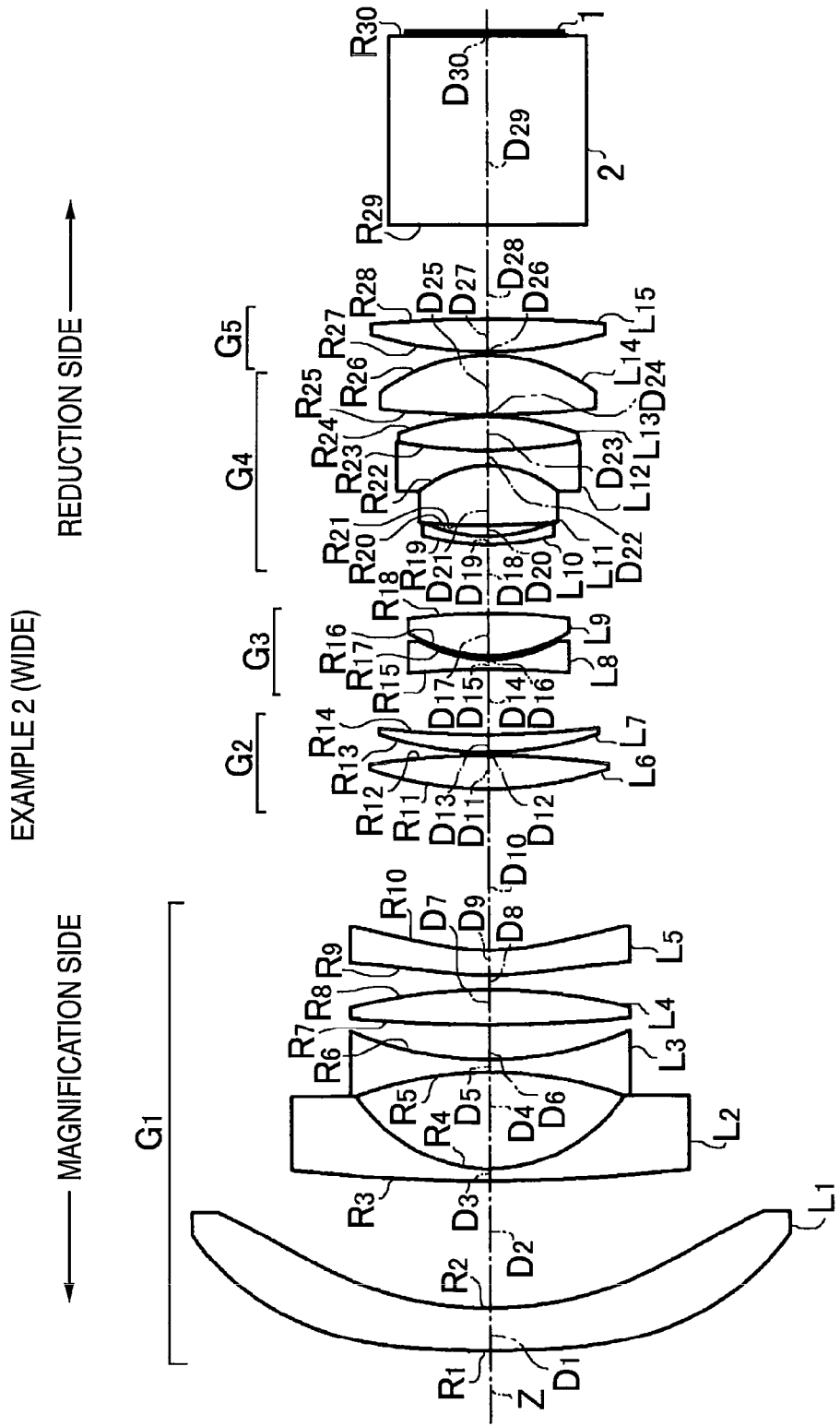
FIG. 3 is a detailed configuration diagram illustrating a wide-angle projection zoom lens (the wide-angle end) according to Example 2.

As shown in FIGS. 3 and 4 (FIG. 3 is a diagram illustrating a lens system configuration at the wide-angle end, FIG. 4 is a diagram illustrating arrangement of the respective lens groups at the wide-angle end (W) and the telephoto end (T)), the wide-angle projection zoom lens according to Example 2 has substantially the same configuration as the wide-angle projection zoom lens according to Example 1. However, in the wide-angle projection zoom lens according to Example 2, there is a difference in that the fourth lens group $G_4$ includes a tenth lens $L_{10}$ formed as a negative meniscus lens convex toward the magnification side, an eleventh lens $L_{11}$ formed as a biconvex lens, a twelfth lens $L_{12}$ formed as a biconcave lens, a thirteenth lens $L_{13}$ formed as a biconvex lens, and a fourteenth lens $L_{14}$ formed as a biconvex lens. In addition, there is another difference in that the eleventh lens $L_{11}$, the twelfth lens $L_{12}$, and the thirteenth lens $L_{13}$ constitute a three-element cemented lens (the cemented surface between the eleventh lens $L_{11}$ and the twelfth lens $L_{12}$ has a shape concave toward the magnification side, and the cemented surface between the twelfth lens $L_{12}$ and the thirteenth lens $L_{13}$ has a shape concave toward the reduction side).

Further, the fifth lens group $G_5$ includes only the fifteenth lens $L_{15}$ formed as a biconvex lens.

The upper part of Table 3 shows radius of curvatures R (mm) of the lens surfaces of the projection lens system according to Example 2, center thicknesses of the lenses and air spaces between the lenses D (mm), refractive indices $N_d$ of the lenses at the d-line, and Abbe numbers $v_d$ of the lenses at the d-line.

Further, as described above, in the wide-angle projection zoom lens according to Example 2, the movable zoom lens groups $G_2$ to $G_4$ are configured to be moved independently from each other in the direction of the optical axis Z during zooming. The lower part of Table 3 shows values of the variable spaces ($D_{10}$, $D_{14}$, $D_{18}$, and $D_{26}$) at the wide-angle end (WIDE) and telephoto end (TELE) and the medium position (MEDIUM) therebetween.

Further, Table 4 shows values of the respective constants K, $A_4$, $A_6$, $A_8$, $A_{10}$, and $A_{12}$ corresponding to the respective aspheric surfaces.

TABLE 3

FOCAL LENGTH: 9.77-12.70, ANGLE OF VIEW: 96.8 DEGREES, SPEED: F1.70-1.83

| Surface Number | R | D | Effective Diameter | $N_d$ | $v_d$ |
|---|---|---|---|---|---|
| 1* | 230.9465 | 5.800 | 80.94 | 1.49100 | 57.6 |
| 2* | 54.0935 | 17.259 | 73.66 | | |
| 3 | 238.4338 | 1.640 | 49.73 | 1.79952 | 42.2 |

TABLE 3-continued

FOCAL LENGTH: 9.77-12.70, ANGLE OF VIEW: 96.8 DEGREES, SPEED: F1.70-1.83

| | | | | | |
|---|---|---|---|---|---|
| 4 | 21.7971 | 13.071 | 36.16 | | |
| 5 | −53.0745 | 1.672 | 36.01 | 1.48749 | 70.2 |
| 6 | 48.1734 | 4.756 | 35.44 | | |
| 7 | 202.1564 | 4.723 | 36.08 | 1.83400 | 37.2 |
| 8 | −77.3787 | 1.997 | 36.21 | | |
| 9* | 49.0895 | 3.400 | 34.94 | 1.49100 | 57.6 |
| 10* | 33.8425 | **(Variable 1) | 33.85 | | |
| 11 | 50.7372 | 4.558 | 31.30 | 1.71747 | 52.6 |
| 12 | −117.0663 | 0.419 | 31.01 | | |
| 13 | 45.6639 | 2.416 | 29.01 | 1.71514 | 29.2 |
| 14 | 130.2590 | **(Variable 2) | 28.60 | | |
| 15 | −131.4544 | 1.400 | 20.55 | 1.71409 | 53.9 |
| 16 | 19.9216 | 0.500 | 18.73 | | |
| 17 | 20.6205 | 5.803 | 18.78 | 1.48527 | 70.6 |
| 18 | −89.2866 | **(Variable 3) | 18.00 | | |
| 19 | 33.6368 | 1.140 | 17.00 | 1.80518 | 25.4 |
| 20 | 22.0070 | 1.452 | 16.50 | | |
| 21 | 99.7417 | 8.158 | 16.65 | 1.48749 | 70.2 |
| 22 | −14.6961 | 2.080 | 18.55 | 1.83400 | 37.2 |
| 23 | 66.1370 | 4.590 | 22.53 | 1.49700 | 81.6 |
| 24 | −34.7339 | 0.200 | 23.89 | | |
| 25 | 121.3280 | 8.135 | 26.94 | 1.49700 | 81.6 |
| 26 | −24.1755 | **(Variable 4) | 28.51 | | |
| 27 | 56.2265 | 4.388 | 31.25 | 1.80497 | 45.6 |
| 28 | −200.5265 | 12.740 | 31.01 | | |
| 29 | ∞ | 25.500 | 27.02 | 1.51633 | 64.1 |
| 30 | ∞ | 0.156 | 22.04 | | |

| | $D_{10}$ (Variable 1) | $D_{14}$ (Variable 2) | $D_{18}$ (Variable 3) | $D_{26}$ (Variable 4) |
|---|---|---|---|---|
| WIDE | 21.906 | 8.857 | 9.373 | 0.500 |
| MEDIUM | 16.452 | 12.047 | 5.905 | 6.236 |
| TELE | 12.181 | 15.868 | 1.000 | 11.594 |

*Aspheric Surface
**Variable Space

TABLE 4

* Aspheric Coefficient

| Surface Number | K | $A_4$ | $A_6$ |
|---|---|---|---|
| 1st Surface | 1.0000000 | 7.7372868E−06 | −5.2841080E−09 |
| 2nd Surface | 1.0000000 | 4.1677379E−06 | −3.7306393E−09 |
| 9th Surface | 1.0000000 | −2.5830702E−05 | 3.4050162E−08 |
| 10th Surface | 1.0000000 | −2.8375183E−05 | 3.4221005E−08 |

| Surface Number | $A_8$ | $A_{10}$ | $A_{12}$ |
|---|---|---|---|
| 1st Surface | 3.4205977E−12 | −1.2503911E−15 | 2.4423810E−19 |
| 2nd Surface | −2.0495206E−12 | 2.2969719E−15 | −5.5992772E−19 |
| 9th Surface | −2.9149668E−11 | 1.4327304E−14 | 1.9470022E−17 |
| 10th Surface | −2.0535300E−11 | −4.2708917E−14 | 1.0059607E−16 |

Example 3

Figure 5:
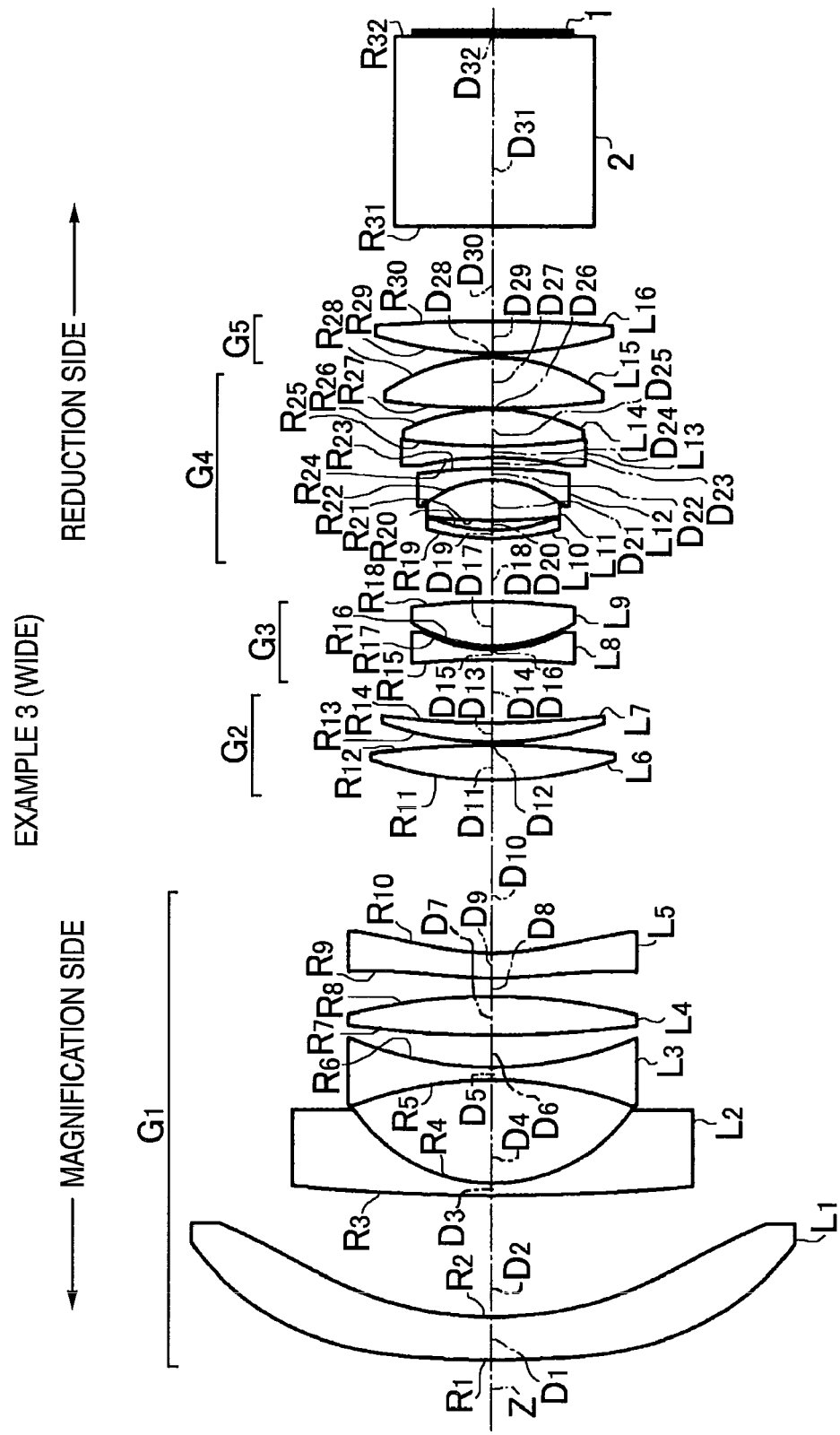
FIG. 5 is a detailed configuration diagram illustrating a wide-angle projection zoom lens (the wide-angle end) according to Example 3.
Figure 6:
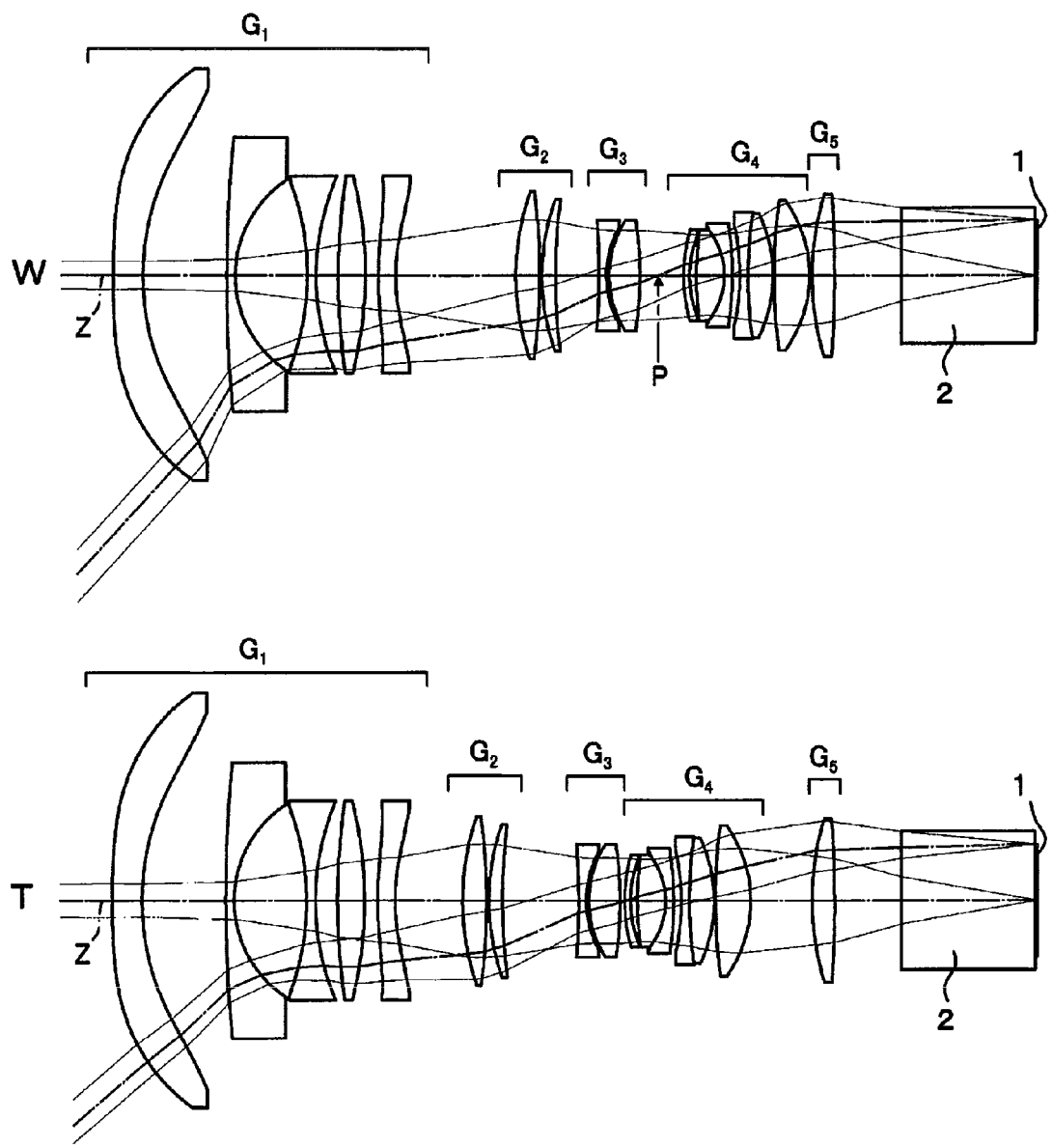
FIG. 6 is a configuration diagram illustrating arrangement of lens groups in the wide-angle end (W) and the telephoto end (T) of the wide-angle projection zoom lens according to Example 3.

As shown in FIGS. 5 and 6 (FIG. 5 is a diagram illustrating a lens system configuration at the wide-angle end, FIG. 6 is a diagram illustrating arrangement of the respective lens groups at the wide-angle end (W) and the telephoto end (T)), the wide-angle projection zoom lens according to Example 3 has substantially the same configuration as the wide-angle projection zoom lens according to Example 1.

The upper part of Table 5 shows radius of curvatures R (mm) of the lens surfaces of the projection lens system according to Example 3, center thicknesses of the lenses and air spaces between the lenses D (mm), refractive indices $N_d$ of the lenses at the d-line, and Abbe numbers $v_d$ of the lenses at the d-line.

Further, as described above, in the wide-angle projection zoom lens according to Example 3, the movable zoom lens groups $G_2$ to $G_4$ are configured to be moved independently from each other in the direction of the optical axis Z during zooming. The lower part of Table 5 shows values of the variable spaces ($D_{10}$, $D_{14}$, $D_{18}$, and $D_{28}$) at the wide-angle end (WIDE) and telephoto end (TELE) and the medium position (MEDIUM) therebetween.

Further, Table 6 shows values of the respective constants K, $A_4$, $A_6$, $A_8$, $A_{10}$, and $A_{12}$ corresponding to the respective aspheric surfaces.

TABLE 5

FOCAL LENGTH: 9.77-12.64, ANGLE OF VIEW: 96.7 DEGREES, SPEED: F1.70-1.87

| Surface Number | R | D | Effective Diameter | $N_d$ | $v_d$ |
|---|---|---|---|---|---|
| 1* | 250.9682 | 5.800 | 80.54 | 1.49100 | 57.6 |
| 2* | 54.3304 | 16.285 | 73.20 | | |
| 3 | 289.4217 | 1.640 | 51.64 | 1.79952 | 42.2 |
| 4 | 22.8386 | 13.894 | 37.63 | | |
| 5 | −52.5884 | 1.668 | 37.34 | 1.48749 | 70.2 |
| 6 | 49.4984 | 4.352 | 36.79 | | |
| 7 | 143.5493 | 5.197 | 37.42 | 1.83400 | 37.2 |
| 8 | −79.0142 | 2.514 | 37.50 | | |
| 9* | 58.7539 | 3.400 | 35.56 | 1.49100 | 57.6 |
| 10* | 35.4363 | **(Variable 1) | 34.51 | | |
| 11 | 50.8707 | 4.666 | 31.42 | 1.71467 | 52.6 |
| 12 | −124.4893 | 0.417 | 31.01 | | |
| 13 | 44.7495 | 2.649 | 28.01 | 1.74328 | 27.8 |
| 14 | 118.6956 | **(Variable 2) | 27.42 | | |
| 15 | −125.2225 | 1.400 | 20.34 | 1.71296 | 53.9 |
| 16 | 19.9689 | 0.500 | 18.80 | | |
| 17 | 20.4030 | 6.046 | 18.85 | 1.48744 | 70.3 |
| 18 | −79.6796 | **(Variable 3) | 18.00 | | |
| 19 | 32.7472 | 1.140 | 16.51 | 1.84666 | 23.8 |
| 20 | 21.9464 | 1.330 | 16.00 | | |
| 21 | 75.5232 | 5.445 | 16.18 | 1.48749 | 70.2 |
| 22 | −14.7996 | 1.540 | 17.05 | 1.83400 | 37.2 |
| 23 | −74.9823 | 1.517 | 19.08 | | |
| 24 | −45.5751 | 1.540 | 19.93 | 1.83400 | 37.2 |
| 25 | 84.5007 | 4.878 | 22.22 | 1.49700 | 81.6 |
| 26 | −28.7980 | 0.200 | 23.78 | | |
| 27 | 113.7360 | 6.862 | 27.55 | 1.49700 | 81.6 |
| 28 | −25.7468 | **(Variable 4) | 28.51 | | |
| 29 | 55.7885 | 4.366 | 31.26 | 1.80498 | 45.6 |
| 30 | −217.5201 | 12.740 | 31.01 | | |
| 31 | ∞ | 25.500 | 27.03 | 1.51633 | 64.1 |
| 32 | ∞ | 0.193 | 22.05 | | |

| | $D_{10}$ (Variable 1) | $D_{14}$ (Variable 2) | $D_{18}$ (Variable 3) | $D_{28}$ (Variable 4) |
|---|---|---|---|---|
| WIDE | 23.335 | 8.503 | 8.528 | 0.500 |
| MEDIUM | 17.496 | 11.427 | 5.442 | 6.500 |
| TELE | 13.051 | 14.926 | 1.000 | 11.897 |

*Aspheric Surface
**Variable Space

TABLE 6

* Aspheric Coefficient

| Surface Number | K | $A_4$ | $A_6$ |
|---|---|---|---|
| 1st Surface | 1.000000 | 7.8029935E−06 | −5.2819701E−09 |
| 2nd Surface | 1.000000 | 4.0133673E−06 | −3.3369476E−09 |

TABLE 6-continued

| | * Aspheric Coefficient | | |
|---|---|---|---|
| 9th Surface | 1.000000 | −2.5999802E−05 | 3.2151930E−08 |
| 10th Surface | 1.000000 | −2.8364225E−05 | 2.9684241E−08 |
| Surface Number | $A_8$ | $A_{10}$ | $A_{12}$ |
| 1st Surface | 3.3618896E−12 | −1.2136942E−15 | 2.3568854E−19 |
| 2nd Surface | −2.9878183E−12 | 2.9973137E−15 | −7.2897925E−19 |
| 9th Surface | −4.1716969E−11 | 6.9999815R−14 | −5.6763886E−17 |
| 10th Surface | −1.6737442E−11 | −1.6387514E−14 | 4.1852690E−17 |

Example 4

Figure 7:
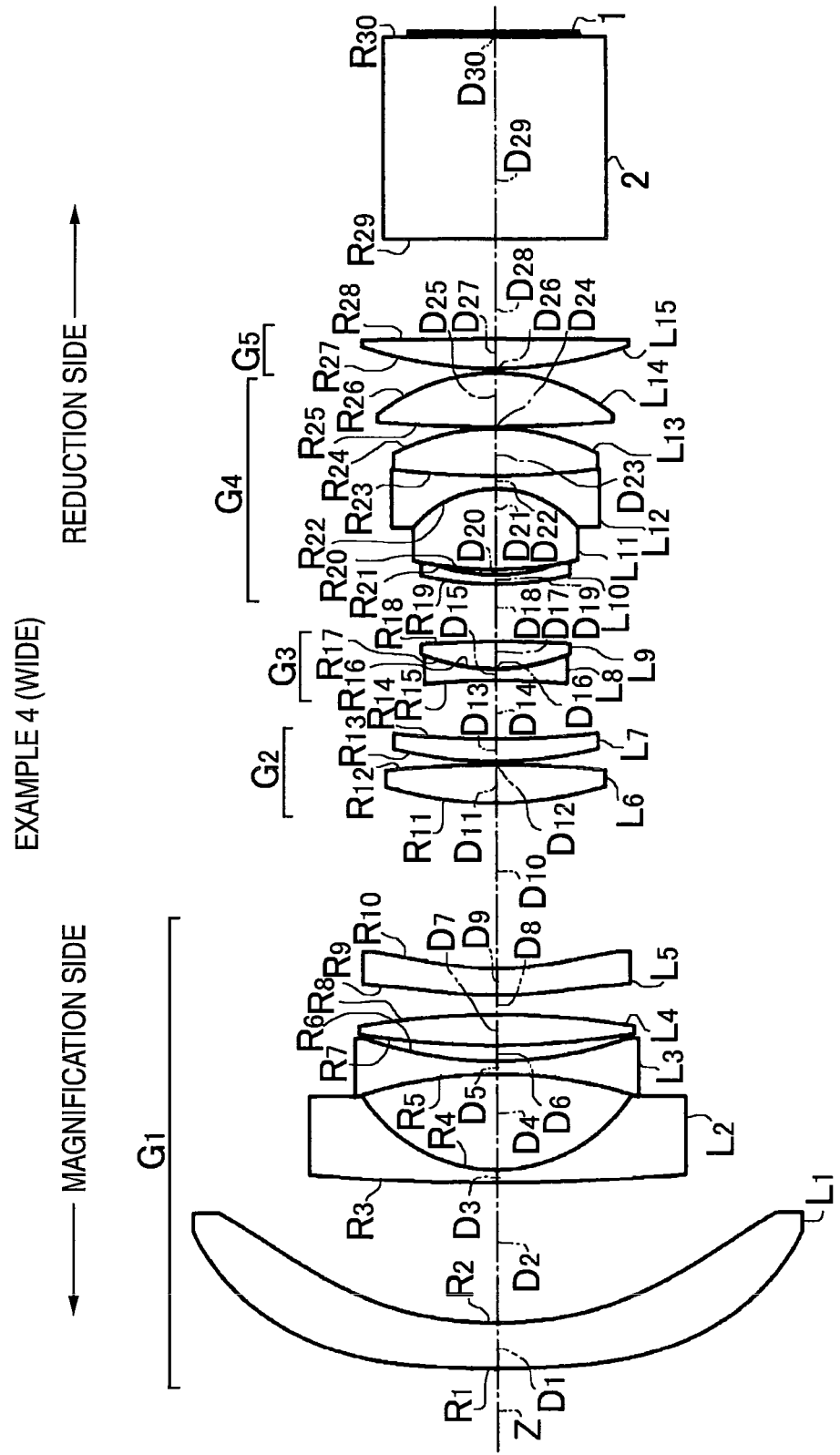
FIG. 7 is a detailed configuration diagram illustrating a wide-angle projection zoom lens (the wide-angle end) according to Example 4.
Figure 8:
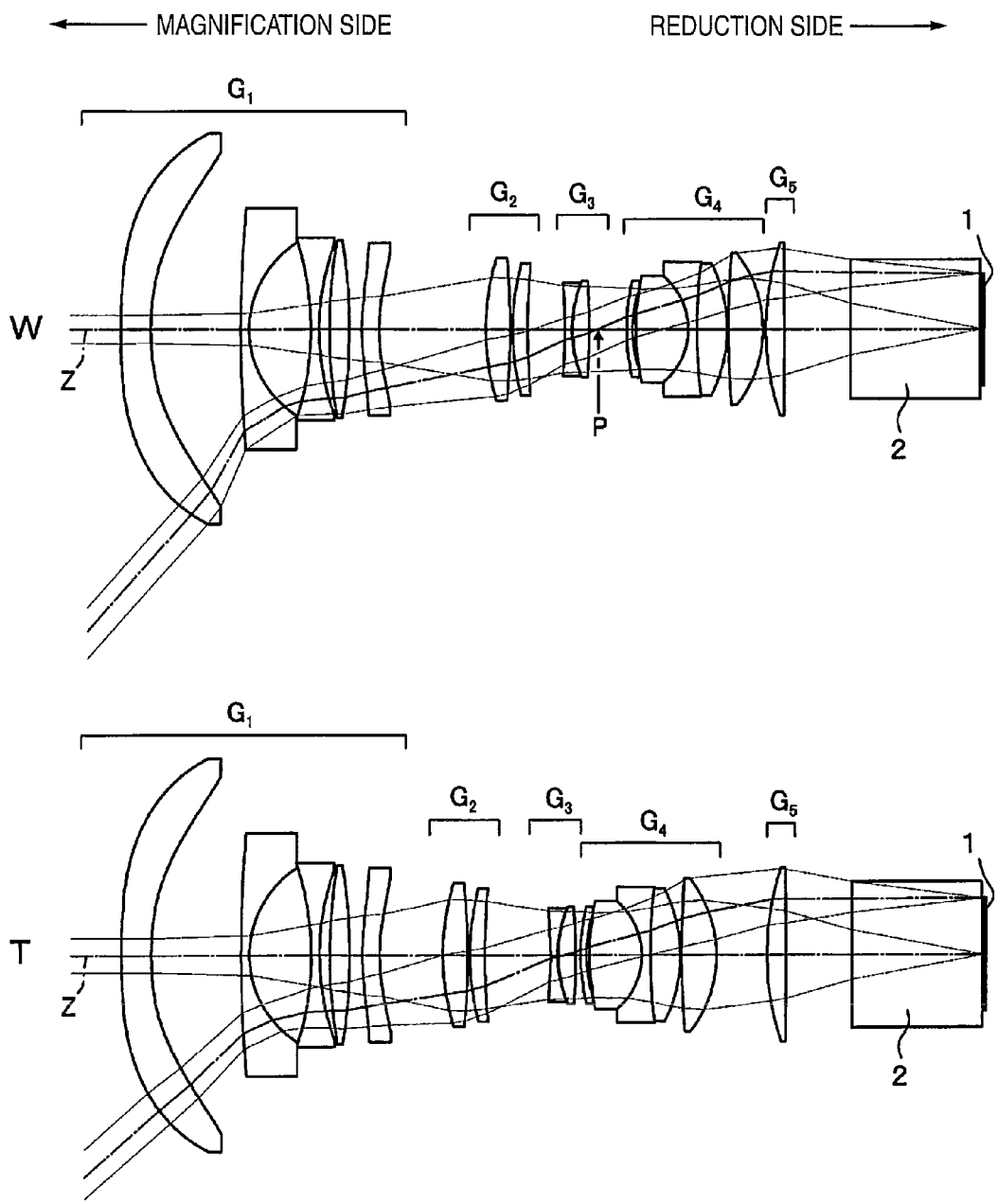
FIG. 8 is a configuration diagram illustrating arrangement of lens groups in the wide-angle end (W) and the telephoto end (T) of the wide-angle projection zoom lens according to Example 4.
Figure 9:
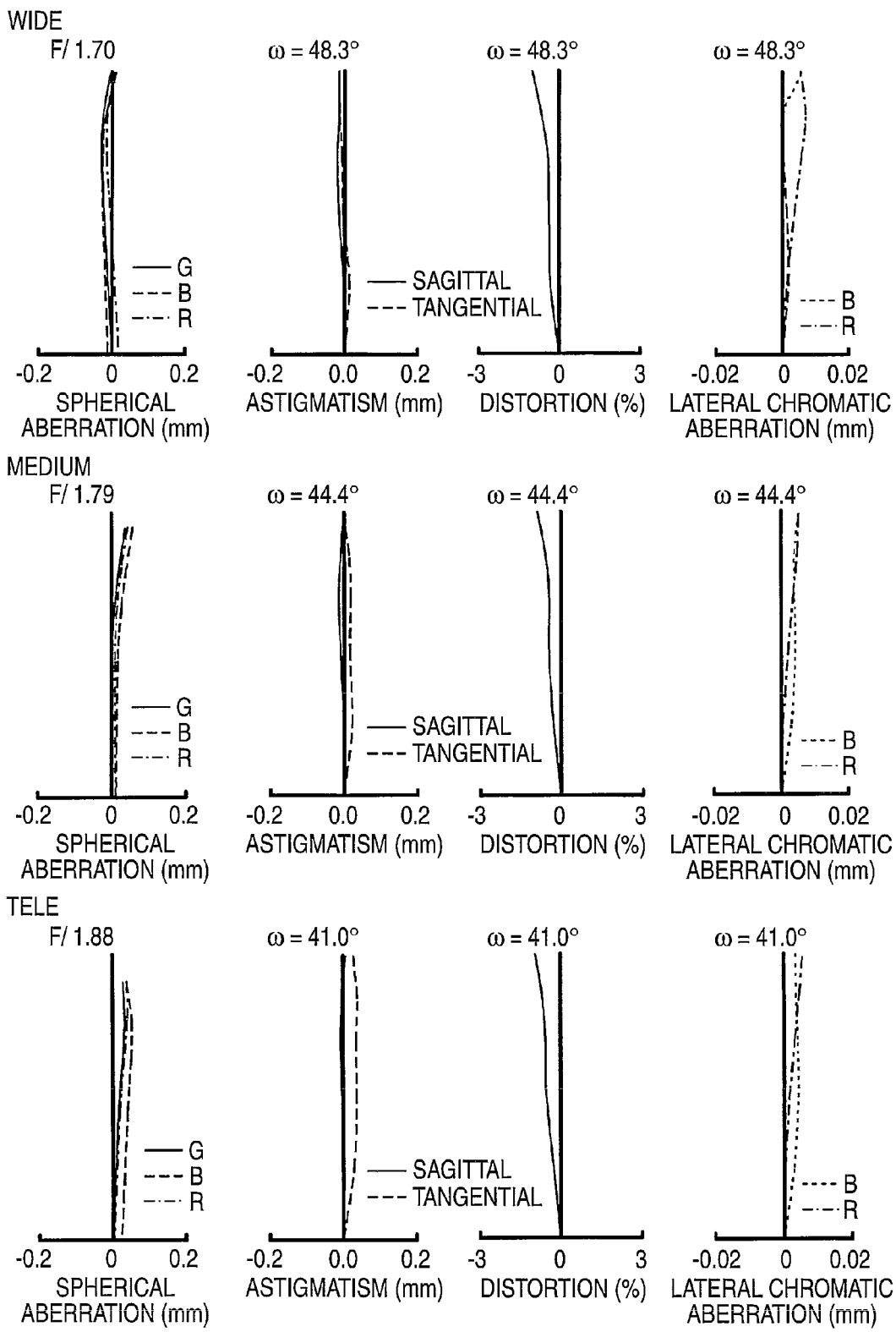
FIG. 9 is a diagram illustrating aberrations of the wide-angle projection zoom lens according to Example 1.
Figure 10:
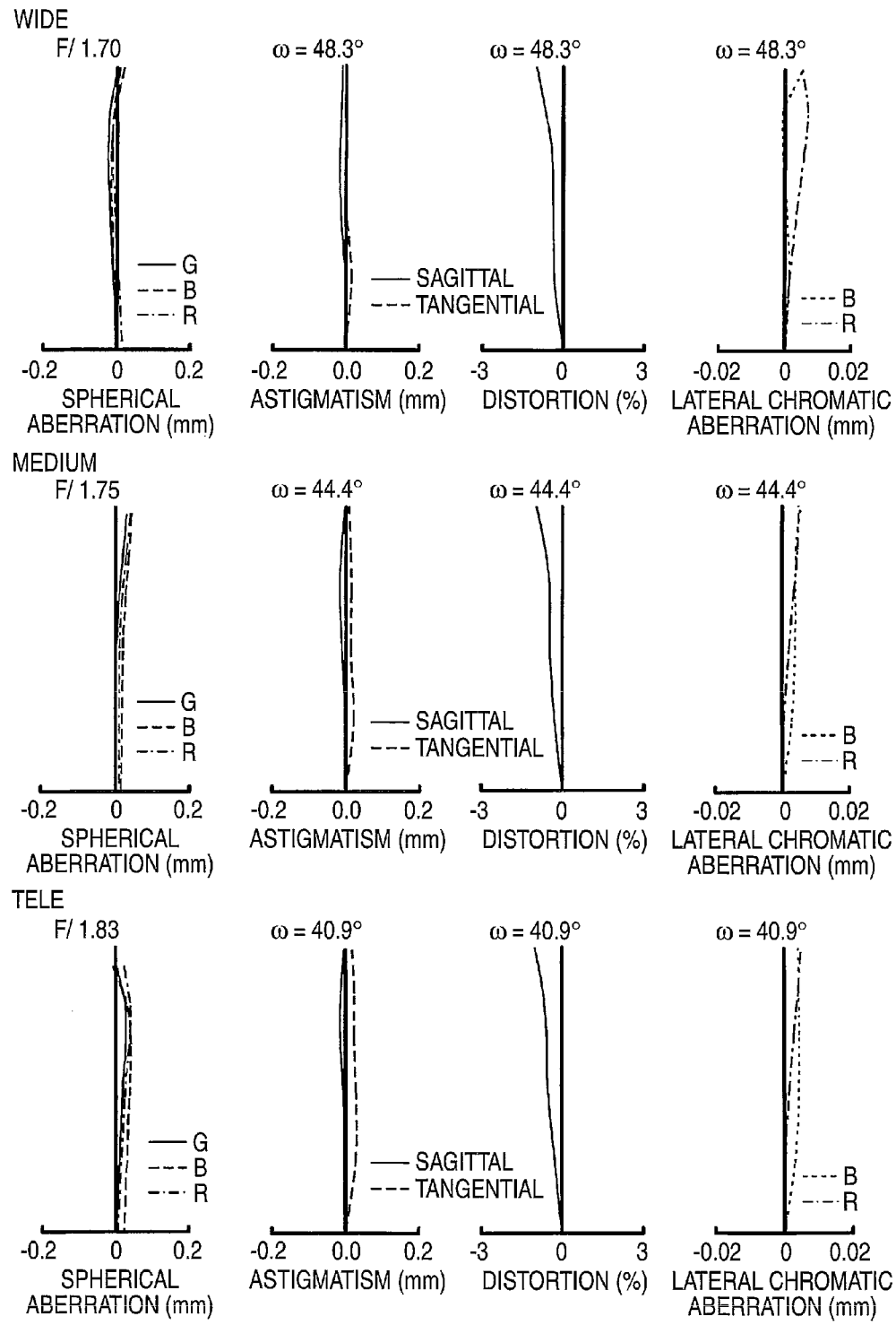
FIG. 10 is a diagram illustrating aberrations of the wide-angle projection zoom lens according to Example 2.
Figure 11:
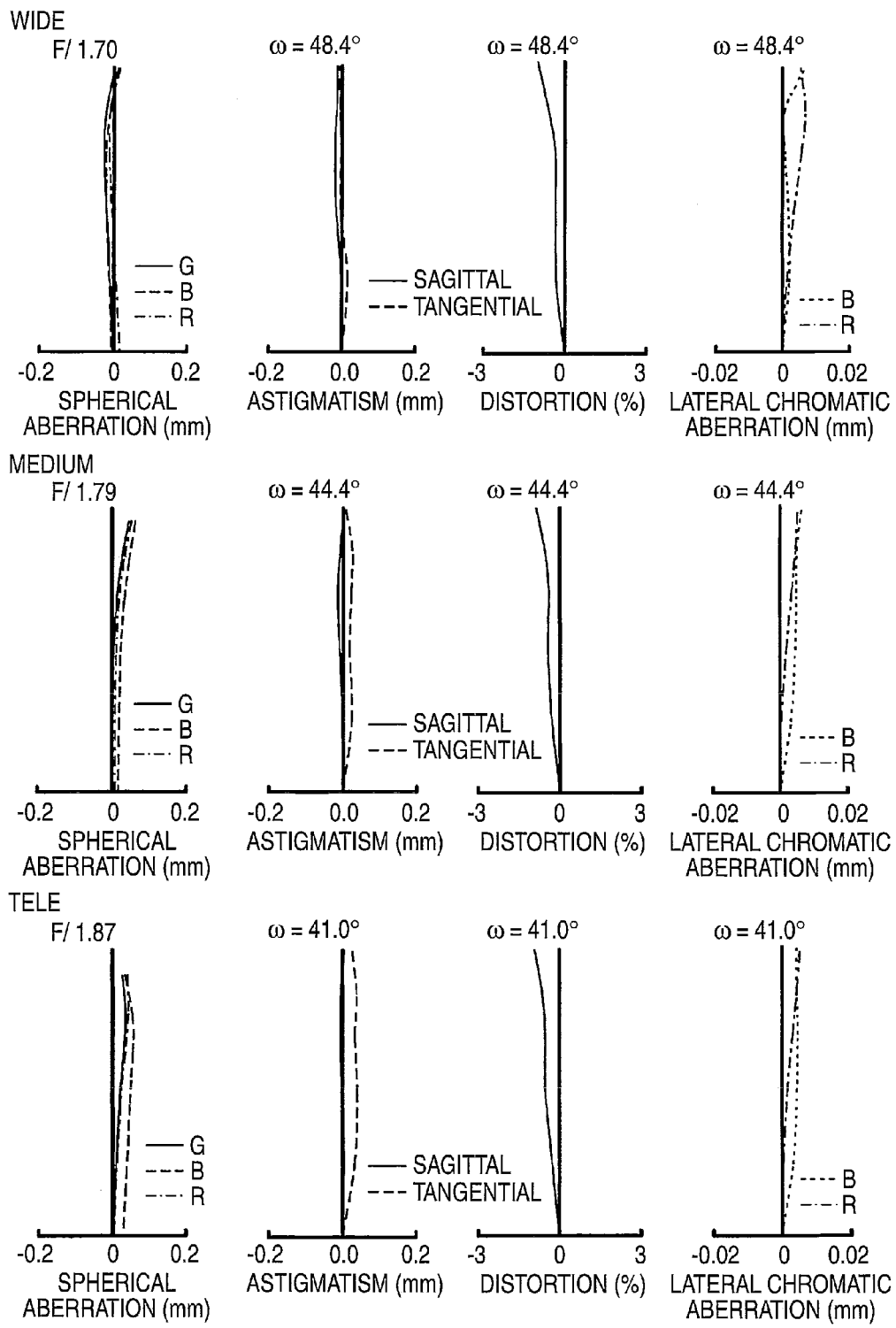
FIG. 11 is a diagram illustrating aberrations of the wide-angle projection zoom lens according to Example 3.
Figure 12:
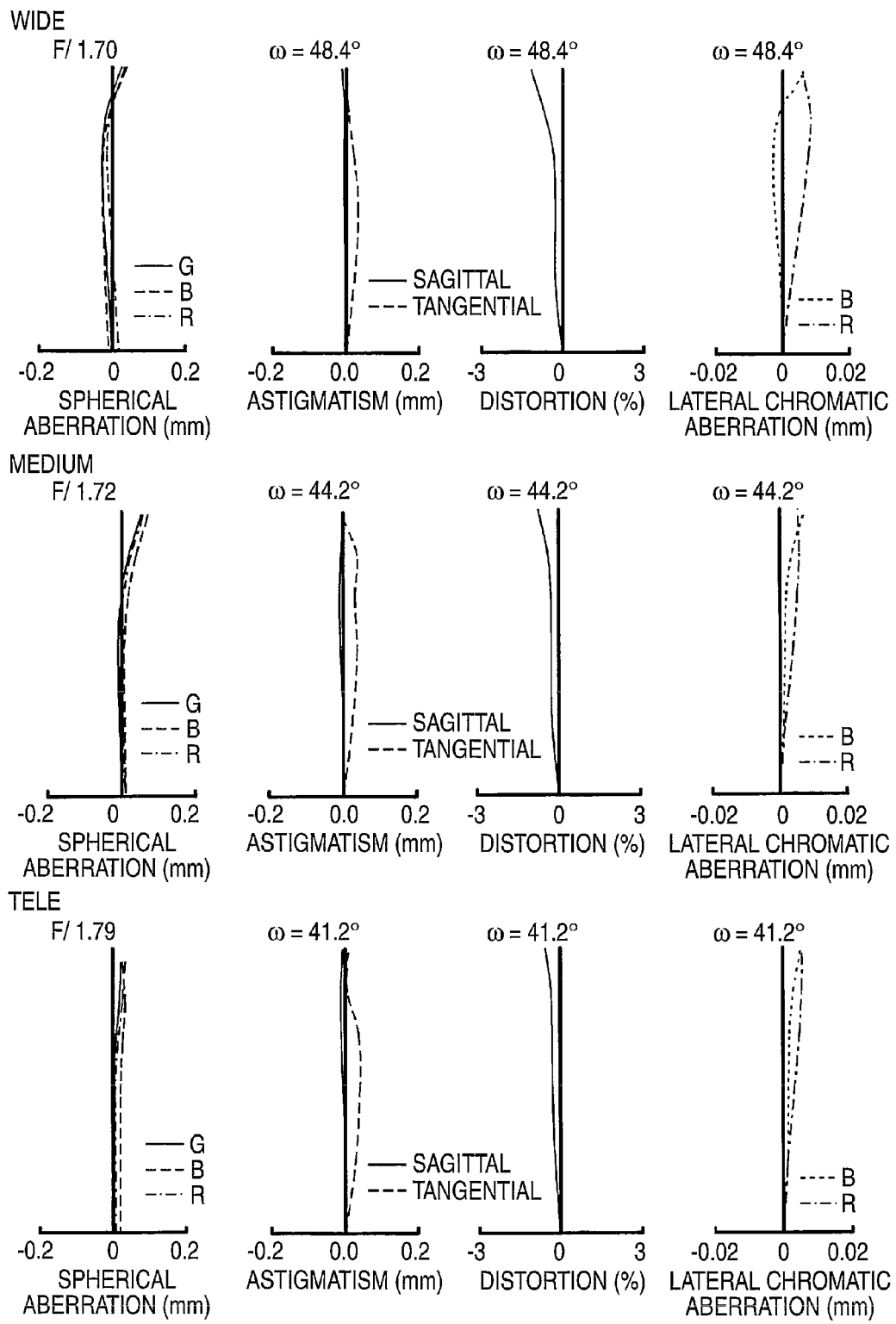
FIG. 12 is a diagram illustrating aberrations of the wide-angle projection zoom lens according to Example 4.

As shown in FIGS. 7 and 8 (FIG. 7 is a diagram illustrating a lens system configuration at the wide-angle end, FIG. 8 is a diagram illustrating arrangement of the respective lens groups at the wide-angle end (W) and the telephoto end (T)), the wide-angle projection zoom lens according to Example 4 has substantially the same configuration as the wide-angle projection zoom lens according to Example 2. However, there is a difference in that the fifth lens group $G_5$ includes the fifteenth lens $L_{15}$ formed as a positive meniscus lens convex toward the magnification side.

The upper part of Table 7 shows radius of curvatures R (mm) of the lens surfaces of the projection lens system according to Example 4, center thicknesses of the lenses and air spaces between the lenses D (mm), refractive indices $N_d$ of the lenses at the d-line, and Abbe numbers $v_d$ of the lenses at the d-line.

Further, as described above, in the wide-angle projection zoom lens according to Example 4, the movable zoom lens groups $G_2$ to $G_4$ are configured to be moved independently from each other in the direction of the optical axis Z during zooming. The lower part of Table 7 shows values of the variable spaces ($D_{10}$, $D_{14}$, $D_{18}$, and $D_{26}$) at the wide-angle end (WIDE) and telephoto end (TELE) and the medium position (MEDIUM) therebetween.

Further, Table 8 shows values of the respective constants K, $A_4$, $A_6$, $A_8$, $A_{10}$, and $A_{12}$ corresponding to the respective aspheric surfaces.

TABLE 7

FOCAL LENGTH: 9.77-12.55, ANGLE OF VIEW:
96.8 DEGREES, SPEED: F1.70-1.79

| Surface Number | R | D | Effective Diameter | $N_d$ | $v_d$ |
|---|---|---|---|---|---|
| 1* | 227.6009 | 5.800 | 77.12 | 1.49100 | 57.6 |
| 2* | 53.2898 | 17.672 | 70.51 | | |
| 3 | 277.9984 | 1.640 | 47.77 | 1.78590 | 44.2 |
| 4 | 20.3011 | 12.080 | 34.14 | | |
| 5 | −57.1830 | 1.617 | 34.07 | 1.48749 | 70.2 |
| 6 | 49.5603 | 1.983 | 33.40 | | |
| 7 | 104.4830 | 3.898 | 33.50 | 1.83400 | 37.2 |
| 8 | −106.9864 | 2.460 | 33.47 | | |
| 9* | 50.7263 | 3.400 | 32.35 | 1.49100 | 57.6 |
| 10* | 36.7131 | **(Variable 1) | 31.24 | | |
| 11 | 48.2046 | 4.823 | 26.92 | 1.83481 | 42.7 |
| 12 | −147.5374 | 0.451 | 26.06 | | |
| 13 | 51.2213 | 2.920 | 24.00 | 1.74077 | 27.8 |
| 14 | 127.4922 | **(Variable 2) | 23.28 | | |
| 15 | −97.8312 | 1.400 | 18.20 | 1.71300 | 53.9 |
| 16 | 23.8908 | 0.112 | 17.41 | | |
| 17 | 25.2796 | 3.452 | 17.41 | 1.48749 | 70.2 |
| 18 | −130.1543 | **(Variable 3) | 17.20 | | |
| 19 | 41.6582 | 1.140 | 16.88 | 1.84666 | 23.8 |
| 20 | 23.7308 | 0.723 | 16.50 | | |
| 21 | 50.0057 | 10.286 | 16.48 | 1.48749 | 70.2 |
| 22 | −13.7027 | 1.640 | 18.76 | 1.83400 | 37.2 |
| 23 | 105.9616 | 5.960 | 22.74 | 1.49700 | 81.6 |
| 24 | −28.6139 | 0.200 | 25.00 | | |
| 25 | 180.6368 | 6.836 | 29.29 | 1.49700 | 81.6 |
| 26 | −24.2011 | **(Variable 4) | 29.96 | | |
| 27 | 52.3339 | 3.728 | 33.57 | 1.83481 | 42.7 |
| 28 | −1317.8137 | 12.740 | 33.40 | | |
| 29 | ∞ | 25.500 | 28.46 | 1.51633 | 64.1 |
| 30 | ∞ | 0.190 | 22.07 | | |

| | $D_{10}$ (Variable 1) | $D_{14}$ (Variable 2) | $D_{18}$ (Variable 3) | $D_{26}$ (Variable 4) |
|---|---|---|---|---|
| WIDE | 21.023 | 7.398 | 7.356 | 0.500 |
| MEDIUM | 15.752 | 10.257 | 4.412 | 5.843 |
| TELE | 12.483 | 12.964 | 1.000 | 9.840 |

*Aspheric Surface
**Variable Space

TABLE 8

| | * Aspheric Coefficient | | |
|---|---|---|---|
| Surface Number | K | $A_4$ | $A_6$ |
| 1st Surface | 1.0000000 | 1.0971089E−05 | −1.1388973E−08 |
| 2nd Surface | 1.0000000 | 8.4521747E−06 | −1.2723925E−08 |
| 9th Surface | 1.0000000 | −2.5423272E−05 | 3.5322947E−08 |
| 10th Surface | 1.0000000 | −2.6418329E−05 | 3.5829905E−08 |
| Surface Number | $A_8$ | $A_{10}$ | $A_{12}$ |
| 1st Surface | 1.0761899E−11 | −5.7168138E−15 | 1.4813578E−18 |
| 2nd Surface | 8.7750655E−12 | −4.1195975E−15 | 8.5365947E−19 |
| 9th Surface | −2.4040329E−11 | −2.8386416E−13 | 8.4600663E−16 |
| 10th Surface | −6.2485432E−11 | −1.6291137E−13 | 7.9802341E−16 |

Further, FIGS. 9 to 12 are aberration diagrams illustrating various aberrations, spherical aberration, distortion, astigmatism, and lateral chromatic aberration at the wide-angle end (WIDE), the medium position (MEDIUM), and the telephoto end (TELE) of the wide-angle projection zoom lenses according to Examples 1 to 4. In each aberration diagram, ω represents a half angle of view. The aberration diagrams of spherical aberrations show aberration curves at the respective wavelengths of G (green), B (blue) and R (red). The aberration diagrams of lateral chromatic aberrations show aberration curves of B and R relative to G. As shown in FIGS. 9 to 12, in the wide-angle projection lens described in Examples 1 to 4, not only distortion and chromatic aberration but also the other aberrations are well corrected. Thus, the wide-angle projection lens is formed as a wide-angle and fast projection lens having a half angle of view in the range of 48.3 to 48.4 degrees and an F number of 1.70 at the wide-angle end.

Further, the wide-angle projection zoom lens according to the invention is not limited to the examples mentioned above, and may be modified to various forms. For example, it may be possible properly to modify the radius of curvatures R of the lenses and the on-axis spacing D.

Furthermore, the projection type display apparatus according to the invention is not limited to the configurations mentioned above, and may be modified to various forms of apparatuses having the wide-angle projection zoom lens according to the invention. As the light valve, it may be possible to use a transmissive or reflective liquid crystal display device, or a micro mirror device (for example, a digital micro mirror device manufactured by Texas Instruments Co.) in which a plurality of inclinable micro mirrors are formed on a substantially flat surface. As the illumination optical system, it may be possible to employ a proper configuration corresponding to types of the light valves.

What is claimed is:

1. A wide-angle projection zoom lens, which is telecentric on a reduction side, comprising, in order from a magnification side:
   a first lens group having a negative refractive power;
   a second lens group having a positive refractive power;
   a third lens group having a negative refractive power;
   a fourth lens group having a positive refractive power; and
   a fifth lens group having a positive refractive power,
   wherein during zooming from a wide-angle end to a telephoto end, the first lens group and the fifth lens group remain stationary, and the second lens group, the third lens group, and the fourth lens group are movable in a direction of an optical axis so as to narrow a space between the first lens group and the second lens group and widen a space between the fourth lens group and the fifth lens group, and
   wherein the first lens group includes five lenses having negative, negative, negative, positive, negative refractive powers in order from the magnification side, and
   in the first lens group, the negative lens closest to the magnification side and the negative lens closest to the reduction side are formed as aspheric lenses made of plastic.

2. The wide-angle projection zoom lens according to claim 1,
   wherein the second lens group includes two positive lenses.

3. The wide-angle projection zoom lens according to claim 1,
   wherein the third lens group includes a negative lens and a positive lens in order from the magnification side, and
   in the third lens group, a surface of the negative lens on the reduction side is formed as a concave surface, and a surface of the positive lens on the magnification side is formed as a convex surface.

4. The wide-angle projection zoom lens according to claim 1,
   wherein the fourth lens group includes, in order from the magnification side:
   a negative meniscus lens convex toward the magnification side;
   a first cemented lens having a cemented surface formed in a shape concave toward the magnification side;
   a second cemented lens having a cemented surface formed in a shape concave toward the reduction side; and
   a positive lens.

5. The wide-angle projection zoom lens according to claim 1,
   wherein the fourth lens group includes, in order from the magnification side:
   a negative meniscus lens convex toward the magnification side;
   a three-element cemented lens having, in order from a magnification side, a first cemented surface formed in a shape concave toward the magnification side and a second cemented surface formed in a shape concave toward the reduction side; and
   a positive lens.

6. The wide-angle projection zoom lens according to claim 1,
   wherein the fifth lens group includes a single positive lens.

7. A projection type display apparatus comprising:
   a light source;
   a light valve;
   an illumination optical unit guiding rays originated from the light source into the light valve; and
   the wide-angle projection zoom lens, which is telecentric on the reduction side, according to claim 1,
   wherein the rays originated from the light source are optically modulated by the light valve, and are projected onto a screen by the wide-angle projection zoom lens.

8. The wide-angle projection zoom lens according to claim 2,
   wherein the third lens group includes a negative lens and a positive lens in order from the magnification side, and
   in the third lens group, a surface of the negative lens on the reduction side is formed as a concave surface, and a surface of the positive lens on the magnification side is formed as a convex surface.

9. The wide-angle projection zoom lens according to claim 8,
   wherein the fourth lens group includes, in order from the magnification side:
   a negative meniscus lens convex toward the magnification side;
   a first cemented lens having a cemented surface formed in a shape concave toward the magnification side;
   a second cemented lens having a cemented surface formed in a shape concave toward the reduction side; and
   a positive lens.

10. The wide-angle projection zoom lens according to claim 9,
    wherein the fifth lens group includes a single positive lens.

11. A projection type display apparatus comprising:
    a light source;
    a light valve;
    an illumination optical unit guiding rays originated from the light source into the light valve; and
    the wide-angle projection zoom lens, which is telecentric on the reduction side, according to claim 10,
    wherein the rays originated from the light source are optically modulated by the light valve, and are projected onto a screen by the wide-angle projection zoom lens.

12. The wide-angle projection zoom lens according to claim 8,
    wherein the fourth lens group includes, in order from the magnification side:
    a negative meniscus lens convex toward the magnification side;
    a three-element cemented lens having, in order from a magnification side, a first cemented surface formed in a shape concave toward the magnification side and a second cemented surface formed in a shape concave toward the reduction side; and
    a positive lens.

13. The wide-angle projection zoom lens according to claim 12,
    wherein the fifth lens group includes a single positive lens.

14. A projection type display apparatus comprising:
    a light source;
    a light valve;
    an illumination optical unit guiding rays originated from the light source into the light valve; and
    the wide-angle projection zoom lens, which is telecentric on the reduction side, according to claim 13,
    wherein the rays originated from the light source are optically modulated by the light valve, and are projected onto a screen by the wide-angle projection zoom lens.

* * * * *